US008734939B2

(12) United States Patent
Herr et al.

(10) Patent No.: US 8,734,939 B2
(45) Date of Patent: May 27, 2014

(54) THERMALLY REVERSIBLE HOT MELT ADHESIVE COMPOSITION CONTAINING MULTIFUNCTIONAL DIENE AND DIENOPHILE COMPOUNDS

(75) Inventors: Donald Herr, Lancaster, PA (US); Laxmisha M. Sridhar, Monmouth Junction, NJ (US); Andrew Slark, Wokinhgam Berkshire (GB)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/323,090

(22) Filed: Dec. 12, 2011

(65) Prior Publication Data

US 2012/0082840 A1    Apr. 5, 2012

Related U.S. Application Data

(63) Continuation of application No. PCT/US2010/038270, filed on Jun. 11, 2010.

(60) Provisional application No. 61/186,127, filed on Jun. 11, 2009.

(51) Int. Cl.
| | |
|---|---|
| *A01K 1/015* | (2006.01) |
| *B32B 27/36* | (2006.01) |
| *B32B 27/00* | (2006.01) |
| *B32B 27/34* | (2006.01) |
| *B23B 9/04* | (2006.01) |
| *C08F 290/14* | (2006.01) |
| *C08F 265/10* | (2006.01) |
| *C08F 267/10* | (2006.01) |
| *C08F 283/00* | (2006.01) |
| *C08F 26/06* | (2006.01) |

(52) U.S. Cl.
USPC ..... 428/221; 428/521; 428/423.1; 428/475.2; 428/412; 428/474.4; 428/473.5; 428/447; 525/418; 525/50; 525/282; 526/262; 526/261; 524/850; 524/539; 156/331.7; 156/329; 156/334; 427/398.1

(58) Field of Classification Search
USPC ........ 428/221, 521, 423.1, 475.2, 412, 474.4, 428/473.5, 447; 525/418, 50, 282; 526/262, 526/261; 524/850, 539; 156/331.7, 329, 156/334; 427/398.1
See application file for complete search history.

(56) References Cited

U.S. PATENT DOCUMENTS

| | | | |
|---|---|---|---|
| 3,435,003 | A | 3/1969 | Craven et al. |
| 4,617,364 | A | 10/1986 | Augustin et al. |
| 5,641,856 | A | 6/1997 | Meurs et al. |
| 5,726,391 | A | 3/1998 | Iyer et al. |
| 5,912,282 | A | 6/1999 | Iyer et al. |
| 6,512,051 | B2 | 1/2003 | Chino et al. |
| 6,933,361 | B2 | 8/2005 | Wudl et al. |
| 7,144,960 | B2 | 12/2006 | Jen et al. |
| 2002/0086952 | A1 | 7/2002 | Chino et al. |
| 2003/0116272 | A1 | 6/2003 | Aubert |
| 2006/0025560 | A1 | 2/2006 | Inoue et al. |

FOREIGN PATENT DOCUMENTS

| | | | |
|---|---|---|---|
| CN | 1239970 | | 12/1999 |
| CN | 1323335 | | 11/2001 |
| EP | 0261669 | | 3/1988 |
| EP | 1666557 | | 6/2006 |
| JP | 08041133 | | 2/1996 |
| JP | 2003-183348 | | 7/2003 |
| JP | 20060193628 | * | 7/2006 |
| JP | 2006-335861 | | 12/2006 |
| WO | 9500576 | | 1/1995 |
| WO | 9942536 | | 8/1999 |

OTHER PUBLICATIONS

International Search Report issued in connection to International Application No. PCT/US2010/038270 mailed Jan. 25, 2011.
Chen et al., New Thermally Remendable Highly Cross-Linked Polymeric Materials, Macromolecules 2003, 36, 1802-1807.
Palmese et al., Remendable Polymric Materials Using Reversible Covalent Bonds, Drexel Univ., Dept. of Chem. & Bio. Eng., (2008).

* cited by examiner

*Primary Examiner* — William Cheung
(74) *Attorney, Agent, or Firm* — James E. Piotrowski

(57) ABSTRACT

The invention relates to a thermally reversible hot melt adhesive that is isocyanate-free, moisture independent, crosslinkable and thermally reversible. The thermally reversible hot melt adhesive may be repeatedly heated and cooled without negatively affecting the performance of the adhesive. The thermally reversible composition may also be used as a primer layer. The thermally reversible hot melt adhesive and primer are particularly well suited for end use applications such as packaging, graphic arts, construction, footwear, textiles, general assembly, automotive and consumer goods.

20 Claims, No Drawings

THERMALLY REVERSIBLE HOT MELT ADHESIVE COMPOSITION CONTAINING MULTIFUNCTIONAL DIENE AND DIENOPHILE COMPOUNDS

This application is a continued application of International Patent Application No. PCT/US2010/038270, which was filed Jun. 11, 2010 and claims benefits of Provisional Application 61/186,127 file Jun. 11, 2009.

FIELD OF THE INVENTION

The invention relates to a thermally reversible hot melt adhesive, in particular isocyanate-free, moisture-independent, thermally reversible hot melt adhesives prepared using at least one multifunctional diene and at least one multifunctional dienophile, wherein at least one of the multifunctional diene monomer/prepolymers or multifunctional dienophile monomer/prepolymers has a reactive functionality greater than 2.1.

BACKGROUND OF THE INVENTION

Hot melt adhesives are solid at room temperature but, upon application of heat, melt to a liquid or fluid state. The hot melt adhesive is applied onto substrates during this liquid or fluid state. On cooling, the adhesive regains its solid form. The hard phase(s) formed upon cooling the adhesive imparts all of the cohesion (strength, toughness, creep and heat resistance) to the final adhesive. "Reactive" or crosslinkable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure. Advantages of hot melt curable adhesives over non-curing hot melt adhesives include improved temperature and chemical resistance.

The majority of "reactive" or crosslinkable hot melts are based on moisture-curing urethane adhesives. These adhesives consist primarily of isocyanate terminated polyurethane prepolymers that react with surface or ambient moisture in order to chain-extend, forming a new polyurethane/urea polymer. Polyurethane prepolymers are conventionally obtained by reacting polyols with isocyanates. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is an irreversible material polymerized primarily through urea and urethane groups.

There are several drawbacks to these "reactive" hot melt compositions. The materials are typically made by reacting excess diisocyanate with polyols. The compositions usually contain two to five percent of unreacted diisocyanates such as MDI (methylene bisphenyl diisocyanate), which are respiratory and skin sensitizers. Also, moisture curable reactive hot melt compositions must be stored in the absence of moisture to prevent premature curing, typically stored under nitrogen, or under inert gas blankets in expensive packaging such as polyolefin coated aluminium bags, to prevent moisture ingress. Moreover, moisture curable reactive hot melt adhesives require costly specialized application equipment for processing to keep moisture out. Furthermore, cure rates of such reactive hot melt composition are variable and highly dependent upon moisture permeating through the adhesive. Hence, atmospheric humidity, moisture content of the substrates, moisture vapor transmission rate of the adhesive and the thickness of the bond line all contribute to the cure rate of reactive hot melt compositions. In addition, polyurethane moisture cure produces $CO_2$, which can cause bubbles in the bond line, weakening the bond strength, and which can cause aesthetic problems, particularly on plastic substrates. Additionally, reactive hot melts cure irreversibly and hence reworkability or remendability is not feasible. Such adhesives cannot be used if premature curing occurs or they cannot be repositioned and/or removed after cure has taken place.

There remains a need for improvements in reactive hot melt technology to expand the application of such adhesives and their effectiveness in such applications. The present invention addresses this need.

SUMMARY OF THE INVENTION

The invention provides a thermally reversible hot melt adhesive. The adhesives of the invention comprise a multifunctional diene monomer/prepolymer and a multifunctional dienophile monomer/prepolymer, wherein at least one of the multifunctional diene monomer/prepolymers or multifunctional dienophile monomer/prepolymers has a reactive functionality greater than 2.1.

In one embodiment, the thermally reversible hot melt adhesive is composed of at least one multifunctional diene monomer/prepolymer and at least one multifunctional dienophile monomer/prepolymer, wherein at least one of the multifunctional diene monomer/prepolymers or multifunctional dienophile monomer/prepolymers has a reactive functionality greater than 2.1 in order to form a non-linear polymer network. The thermally reversible hot melt adhesive may be transported and/or stored at ambient temperatures. Upon heating above a certain temperature, the adhesive dissociates into an uncrosslinked state consisting of multifunctional diene monomer/prepolymer(s) and multifunctional dienophile monomer/prepolymer(s). On cooling the adhesive, or below a certain temperature, the bonds between the diene and dienophile reform back to their original crosslinked state. The thermally reversible hot melt adhesive may be repeatedly heated and cooled without negatively affecting the thermal reversibility or the property of the adhesive.

In a further embodiment, the thermally reversible hot melt composition comprises (I) at least one multifunctional diene monomer or prepolymer having the general structure:

$$L\text{-}(X)_P;$$

where L is independently a monomeric, oligomeric or polymeric unit possessing a backbone selected from the group consisting of but not limited to a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride; X is independently a diene containing one or more of acyclic 1,3-diene, cyclopentadiene, cyclohexadiene, furan, fulvene, pyrrole, naphthalene, anthracene; and P is greater than zero;

(II) at least one multifunctional dienophile monomer or prepolymer having the general structure:

$$L\text{-}(Y)_Q;$$

where L is defined as above; Y is a functionality obtained from a group consisting of one or more of maleimide, isomaleimide, citraconimide, itaconimide, maleate, fumarate, acrylate, methacrylate, cyanoacrylate, benzoquinone, benzoquinone oxime, benzoquinone imine, naphthaquionone, alkylidene malonate and alkyne containing electron withdrawing groups; and Q is greater than zero; and (III) wherein P and Q are the highest functionality of one of the dienes and dienophiles respectively, and at least one of P and Q have the value greater than 2.1. In another embodiment, at least one of P or Q has a value less than 3.0. In a further embodiment, the addition of the P and the Q has a value equal to or greater than 5.0.

In a further embodiment, the thermally reversible hot melt composition may optionally comprise a thermoplastic polymer or resin.

Another embodiment of the invention is directed to a method of preparing a thermally reversible hot melt adhesive. The thermally reversible hot melt adhesive is prepared by reacting at least one multifunctional diene monomer/prepolymer with at least one multifunctional dienophile monomer/prepolymer, wherein at least one of the multifunctional diene monomer/prepolymers or multifunctional dienophile monomer/prepolymers has a reactive functionality greater than 2.1.

Yet another embodiment of the invention is directed to a method for bonding materials together which comprises heating a thermally reversible hot melt adhesive composition of the invention to a molten form, applying the adhesive to a first substrate, bringing a second substrate in contact with the composition applied to the first substrate, and cooling the applied composition whereby the composition cures to a solid form.

A further embodiment of the invention is directed to a method of bonding materials together which comprises mixing an unreacted multifunctional diene monomer/prepolymer and multifunctional dienophile monomer/prepolymer together at a temperature to result in a molten form, keeping the mixture at the molten temperature, applying the adhesive to a first substrate, bringing a second substrate in contact with the composition applied to the first substrate, and cooling the applied composition whereby the composition cures to a solid form.

Still further the invention provides articles manufactured using the adhesive of the invention. Adhesive formulations may be prepared that are particularly well suited for end use applications bonding paper, wood, plastics, textiles, foam, glass, metals, composites and ceramics.

Another embodiment is directed to a thermally reversible composition as a primer layer between an adhesive and a substrate. This primer is composed of at least one multifunctional diene monomer/prepolymer, at least one multifunctional dienophile monomer/prepolymer and optionally at least one solvent, wherein at least one of the multifunctional diene monomer/prepolymers or multifunctional dienophile monomer/prepolymers has a reactive functionality greater than 2.1 in order to form a non-linear polymer network. The thermally reversible primer composition may be transported and/or stored at ambient temperatures. Upon heating above a certain temperature, the primer composition dissociates into an uncrosslinked state consisting of multifunctional diene monomer/prepolymer(s) and multifunctional dienophile monomer/prepolymer(s). On cooling the primer composition, or below a certain temperature, the bonds between the diene and dienophile reform back to their original crosslinked state. The thermally reversible primer may be repeatedly heated and cooled without negatively affecting the thermal reversibility or the property of the primer.

DETAILED DESCRIPTION OF THE INVENTION

All percents are percent by weight of the adhesive composition, unless otherwise stated.

It has now been discovered that the use of a thermally reversible hot melt adhesive can be prepared and used to bond substrates together without the need for moisture to crosslink the adhesive. The adhesive of the invention comprises a multifunctional diene monomer/prepolymer and a multifunctional dienophile monomer/prepolymer. A prepolymer, herein, is defined as an intermediate compound between a monomer(s) and the final polymer, with a molecular weight of about 1,000 to about 10,000 g/mol (typically 1,000 to about 6,000 g/mol), usually with repeating units, and capable of further undergoing reaction and/or polymerization. At least one of the multifunctional diene monomer/prepolymers or multifunctional dienophile monomer/prepolymers has a functionality of greater 2.1 to form a non-linear polymer network.

The thermally reversible reactive hot melt composition comprises:

(I) at least one multifunctional diene monomer/prepolymer having the general structure:

where L is independently a monomer, oligomeric or polymeric unit possessing a backbone selected from the group consisting of but not limited to a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride; X is independently a diene containing one or more of acyclic 1,3-diene, cyclopentadiene, cyclohexadiene, furan, fulvene, pyrrole, naphthalene, anthracene; and P is greater than zero;

(II) at least one multifunctional dienophile monomer/prepolymer having the general structure:

where L is defined as above; Y is a functionality obtained from a group consisting of one or more of maleimide, isomaleimide, citraconimide, itaconimide, maleate, fumarate, acrylate, methacrylate, cyanoacrylate, benzoquinone, benzoquinone oxime, benzoquinone imine, naphthaquionone, alkylidene malonate and alkyne containing electron withdrawing groups; and Q is greater than zero; and (III) wherein, P and Q are the highest functionality, and not an average functionality of the dienes and dienophiles, and at least one of P of Q has a value greater than 2.1. In one aspect, at least one of P or Q is less than 3.0. In a further embodiment, the addition of the P and the Q has a value equal to or greater than 5.0.

The oligomeric or polymeric unit possessing a backbone may be an aliphatic or aromatic hydrocarbon moiety, and may also include heteroatoms. The diene or dienophile or both may optionally contain other functionality that can undergo noncovalent interactions.

In one aspect, the multifunctional diene contains one or more of acyclic 1,3-diene, cyclopentadiene, cyclohexadiene, furan, fulvene, pyrrole. In another embodiment, the multifunctional diene is a multifunctional furan. The multifunctional furan may include urethane, urea, ester, amide, imide, styrene, (meth)acrylate ether, siloxane or a combination of the above or anhydride functionalities. Depending upon the substituents on the multifunctional furan, the furan is a monomer or a prepolymer. Exemplary multifunctional furan monomer and prepolymers include the following:

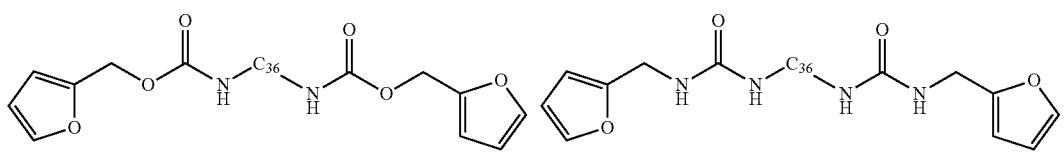
Furan 1        Furan 2
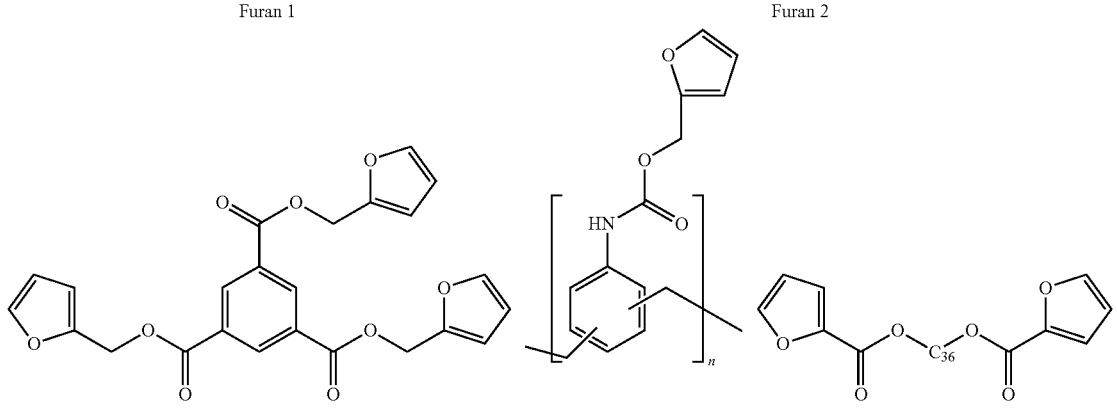
Furan 3      where n = 2-5
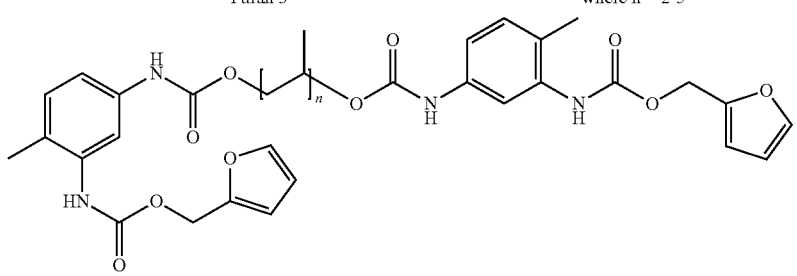
where n = 10-60
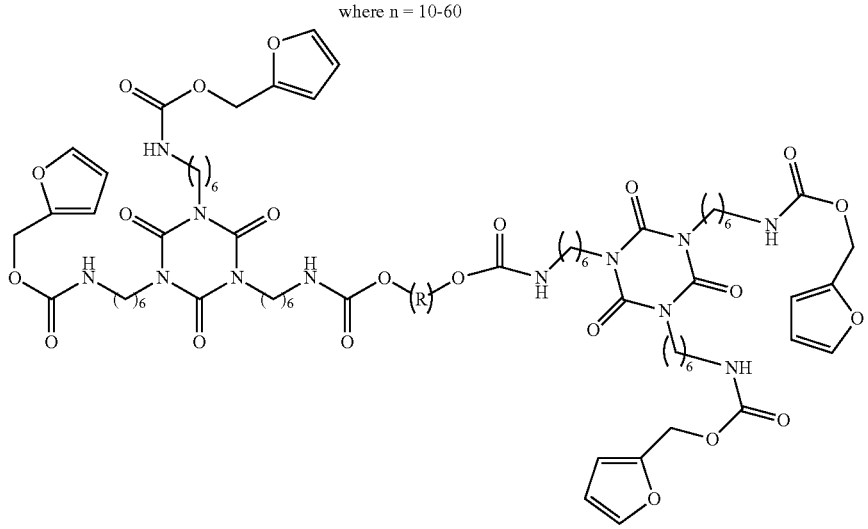
R = Polyesterpolyol or polyetherpolyol backbone or a combination
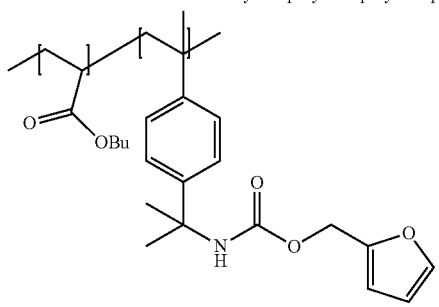

-continued

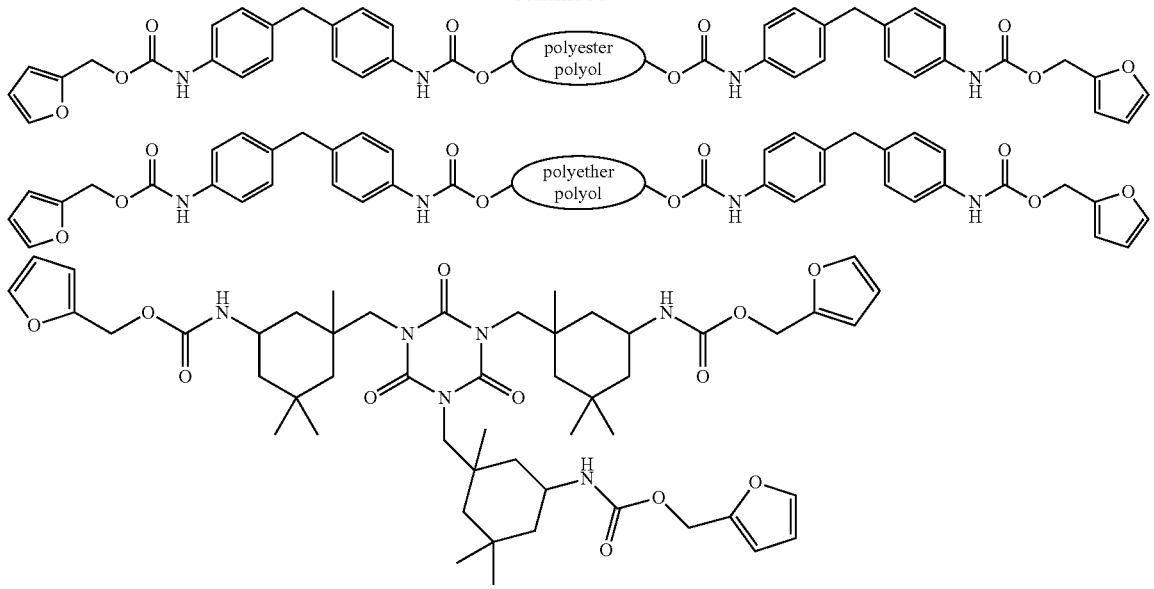

Multifunctional dienophile monomer/prepolymers include those having the generic structure:

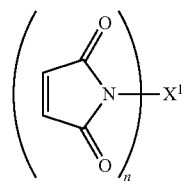

where n is 1 to 3 and $X^1$ is an aliphatic or aromatic group. Exemplary $X^1$ entities include, polybutadienes, polycarbonates, polyurethanes, polyurea, polyethers, polyesters, poly(meth)acrylates, polyolefins, simple hydrocarbons, and simple hydrocarbons containing functionalities such as carbonyl, carboxyl, amide, carbamate, urea, ester, or ether. The multifunctional dienophile monomer/prepolymer can be obtained commercially for example, from Dainippon Ink and Chemical, Inc.

The dienophile may optionally contain other functionality that can undergo noncovalent interactions.

Suitable multifunctional dienophile monomer/prepolymer include, but are not limited to, solid aromatic bismaleimide (BMI) resins, particularly those having the structure:

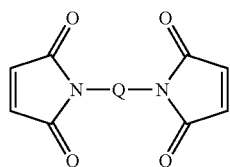

where Q is an aromatic group. Exemplary aromatic groups include:

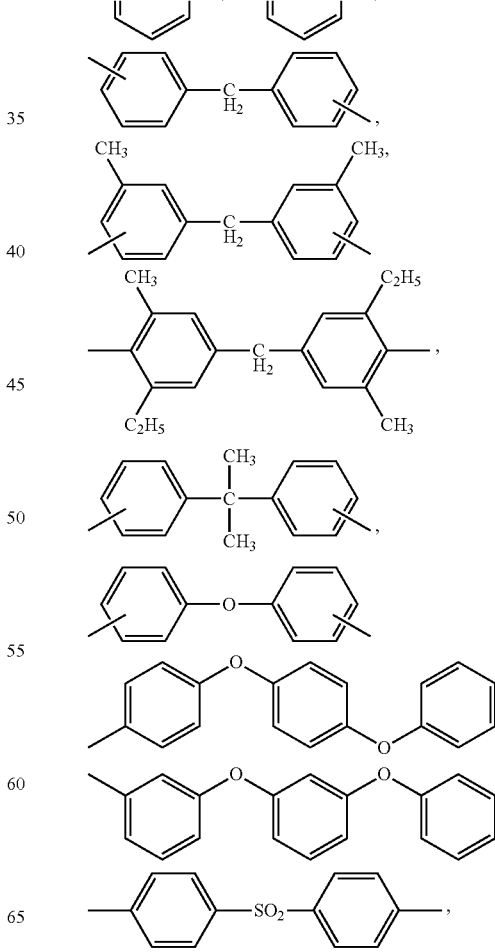

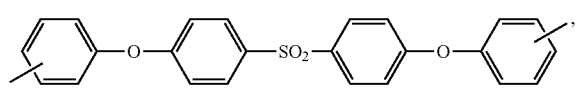

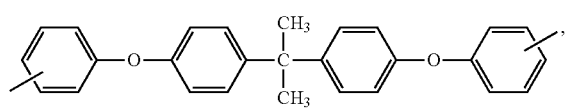

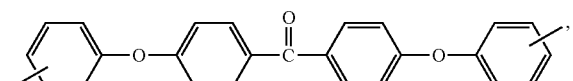

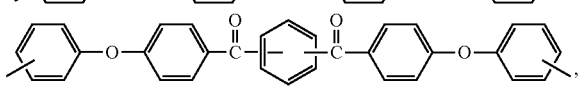

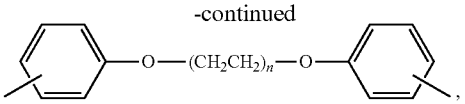

where n is 1-3

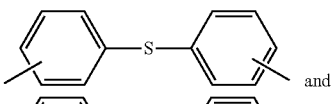 and

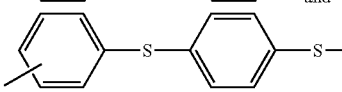

The bismaleimide resins with the above Q bridging groups are commercially available, and can be obtained, among others, from Sartomer (USA) or HOS-Technic GmbH (Austria).

Other suitable maleimide resins include, but are not limited to, the following:

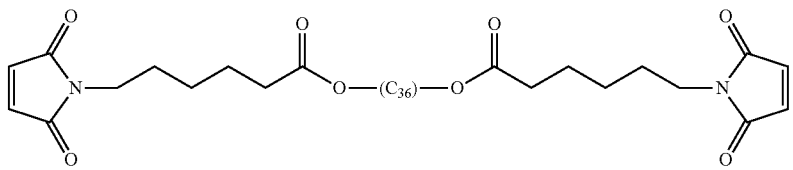

where $C_{36}$ represents a linear or branched chain hydrocarbon chain (with or without cyclic moieties) of 36 carbon atoms;

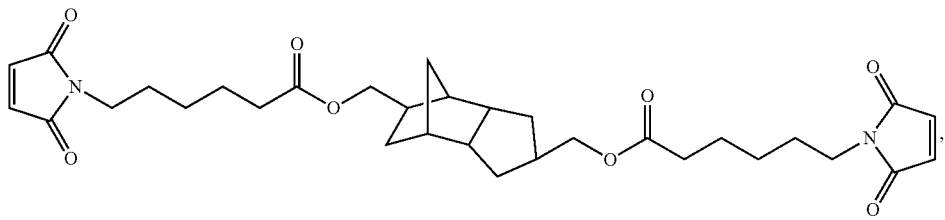

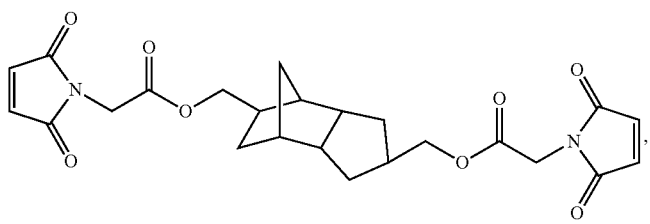

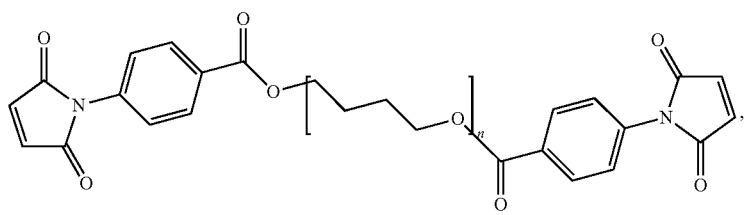

where n = 5-10

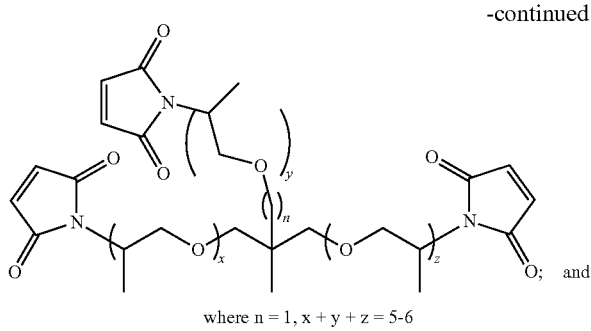

where n = 1, x + y + z = 5-6

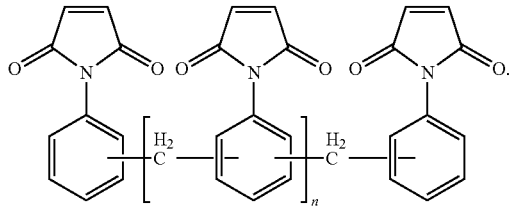

where n = 2-5

In addition, compositions similar to the furan functional monomers/prepolymers exemplified earlier can be used, except that all furan functional groups are replaced instead by maleimide functional groups.

Polyisocyanate monomers can be used to prepare both multifunctional furans (for example, by reaction with substituted furfuryl alcohol or fufuryl amines), and multifunctional maleimides (for example by reaction with a maleimide bearing hydroxyl or carboxyl groups, such as hydroxyl ethyl maleimide). These include aromatic diisocyanates such as 2,4- and 2,6-toluene diisocyanate (TDI); 2,2'-, 2,4'-, and 4,4'-methylenediphenylene diisocyanate (MDI); and 1,4-phenylene diisocyanate; cycloaliphatic diisocyanates such as isophorone diisocyanate (IPDI) and hydrogenated methylenediphenylene diisocyanate (HMDI); and aliphatic diisocyanates such as 1,6-diisocyanatohexane and 1,8-diisocyanatooctane. Suitable polyisocyanates include polymeric MDI having average functionalities of from 2.2 to 2.4, and in particular triisocyanates, e.g. 1,3,5-triisocyanato benzene, and triisocyanates and higher functional isocyanurates prepared by reacting di- or polyisocyanates with themselves in the presence of a trimerization (isocyanurate-promoting catalyst). Such isocyanurate triisocyanates are commercially available, for example as the isocyanurate of isophorone diisocyanate, having a nominal functionality of 3.0, available from Huls America under the trade name Vestanat IPDI 1890/100. This isocyanate has a melting point range of from about 110° C. to 115° C. Other examples of multifunctional isocyanates include Desmodur N75, Desmodur Z4470, Desmodur N3300, Desmodur N3600 available from Bayer.

Isocyanate functional prepolymers can also be used to prepare both multifunctional furans (for example, by reaction with substituted furfuryl alcohol or fufuryl amines), and multifunctional maleimides (for example by reaction with a maleimide bearing hydroxyl or carboxyl groups, such as hydroxyl ethyl maleimide). Most commonly, the prepolymer is prepared by the polymerization of excess polyisocyanate with a polyol, most preferably the polymerization of a diisocyanate with a diol. Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, 2,4-toluene diisocyanate, cyclopentylene-1,3-diisocyanate, cyclo-hexylene-1,4-diisocyanate, cyclohexylene-1,2-diisocyanate, 2,6-toluene diisocyanate, 4,4'-diphenylmethane diisocyanate, 2,4'-diphenylmethane diisocyanate, 2,2-diphenylpropane-4,4'-diisocyanate, xylylene diisocyanate, trimethyl xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanatobenzene, 2,4,6-triisocyanato-toluene, 4,4'-dimethyldiphenylmethane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI), isophoronediisocyanate (IPDI), hydrogenated methylenebisphenyldiisocyanate (HMDI) and toluene diisocyanate (TDI).

The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide. A number of suitable polyether polyols are commercially available. Non-limiting examples include Voranol P400, P725, P1000, P2000, P4000 (Dow), PolyG 20-56 (Arch) and Pluracol P-2010 (BASF), Acclaim 4200 (Bayer). Typical molecular weights of the polether polyols range from about 1000 to about 18,000. Another suitable maleimide resin include:

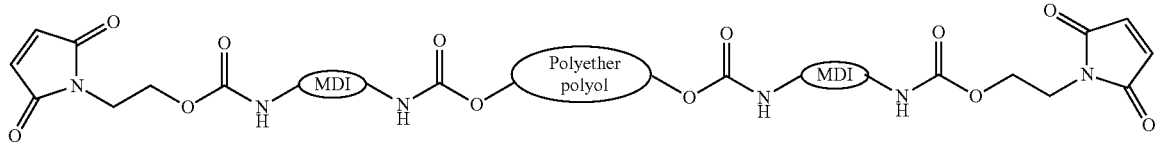

wherein the molecular weight of the polyether polyol segment is from about 1000 to 18,000.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Dimer fatty acids can also be used, where they are the dimerization product of mono- or polyunsaturated acids and/or esters thereof. Preferred dimer fatty acids are dimers of $C_{10}$- to a $C_{30}$, more preferably $C_{12}$- to a $C_{24}$, particularly $C_{14}$- to a $C_{22}$ and especially $C_{18}$ alkyl chains. Suitable dimer fatty acids include the dimerisation products of oleic acid, linoleic acid, linolenic acid, palmitoleic acid and elaidic acid. The dimerisation products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerisation usually results in varying amounts of oligomeric fatty acids (so called "trimer") and residues of monomeric fatty acids (so-called "monomer"), or esters thereof, being present. Suitable dimer fatty acids have a dimer acid content greater than 60%, preferably greater than 75%, more preferably in the range 90 to 99.5%, particularly 95 to 99%, and especially 97 to 99%. Commercially available polyesters which may be used in the practice of the invention include crystalline and amorphous materials such as Dynacoll 7360, 7380, 7330, 7231, 7250 (Evonik), Rucoflex S-105-10 (Bayer), Stepanpol PN110 (Stepan), Priplast 3196 (Croda). Typical molecular weight ranges from about 2000 to about 7000. Another suitable maleimide resin include:

wherein the molecular weight of the polyester polyol segment is from about 2000 to about 7000, Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Multifunctional furans and maleimides can also be synthesized from the aforementioned polyester polyols and polyether polyols by direct esterification with maleimide or furan bearing carboxylic acid functionality. In addition, polyurethane diols, prepared by the addition of polysocyanate and polyols with excess polyol, can also used to prepare multifunctional furans and maleimides by esterification with maleimide or furan bearing carboxylic acid functionality.

Suitable epoxy resins, which also could be used for the synthesis of bismaleimides by a ring opening reaction with maleimide bearing carboxylic acid include but not limited to bisphenol, naphthalene, and aliphatic type epoxies. Commercially available materials include bisphenol type epoxy resins (Epiclon 830LVP, 830CRP, 835LV, 850CRP) available from Dainippon Ink & Chemicals, Inc.; naphthalene type epoxy (Epiclon HP4032) available from Dainippon Ink & Chemicals, Inc.; aliphatic epoxy resins (Araldite CY179, 184, 192, 175, 179) available from Ciba Specialty Chemicals, (Epoxy 1234, 249, 206) available from Dow Corporation, and (EHPE-3150) available from Daicel Chemical Industries, Ltd. Other examples include diglycidylester of hexahydrophthalic anhydride, which is available as CY-184 (Ciba-Geigy); bisphenol-A type epoxy resins, bisphenol-F type epoxy resins, epoxy novolac resins, biphenyl type epoxy resins, naphthalene type epoxy resins, dicyclopentadienephenol type epoxy resins.

Cyclopentadienyl compounds described can be prepared by reacting cyclopentadiene with an alkali metal such as sodium in a suitable solvent, for example, tetrahydrofuran, pentahydropyran, dioxane or a mixture thereof with an aromatic hydrocarbon, to form an alkali metal salt of cyclopentadiene and then reacting the salt directly or indirectly with an electrophile such as an alkyl dihalide or an acid chloride of a diacid. Alkenyl or glycidyl esters of cyclopentadienecarboxylic acid are prepared by the alkali salt of cyclopentadiene with carbon dioxide to form cyclopentadienecarboxylic acid and then subjecting the acid to esterification reaction with an alcohol or by ring opening of glycidyl epoxy resins. The cyclopentadiene bearing prepolymers/polymers can be synthesized analogously.

The stoichiometric ratio of the diene functional groups to the dienophile functional groups in the composition is 0.5:2.0 to 2.0:0.5, preferably 1.0:2.0 to 2.0:1.0, more preferably about 0.9:1.1 to 1.1:0.9.

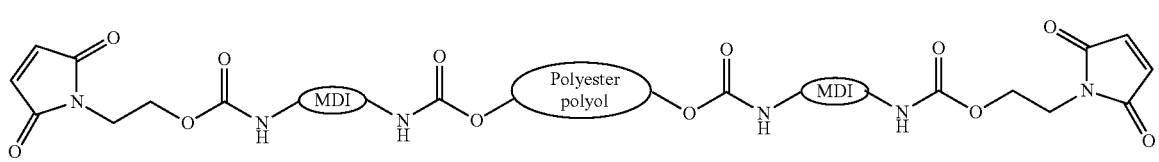

The thermally reversible hot melt adhesive may optionally contain a thermoplastic polymer with molecular weight typically in the range, but not limited to Mn=5,000 to 100,000 g/mole. This may be a polymer obtained via free-radical copolymerization of any of the common vinyl monomers such as ethylene, propylene, butadiene, styrene, vinyl acetate, methacrylates, acrylates, maleic anhydride and vinyl acetate. This also includes copolymer such as ethylene-vinyl acetate (EVA) or ethylene-vinyl acetate-maleic anhydride terpolymer. Alternatively, the polymer can be formed from the step growth or addition of functional groups including, but not limited to polyesters, polycarbonates, polyurethanes, polyamides, polysiloxanes. The thermoplastic polymer may contain pendant functional groups such as acid, anhydride, hydroxyl or epoxy groups. Levels employed will typically range from 1 to 50 wt % of a thermoplastic polymer, preferably 5-40 wt %, and most preferably 10-30 wt %, based on the total weight of the adhesive.

In a further embodiment of the invention, the thermoplastic polymer is a (meth)acrylic polymer. The poly(meth)acrylate segments may be linear or branched with a wide range of Tg values, between about −48° C. and 105° C., preferably about −20° C. to 85° C. and more preferably 15° C. to 85° C. The polymer comprises copolymerized alkyl(meth)acrylic monomers. Suitable comonomers include the $C_1$ to $C_{12}$ esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl(lauryl)methacrylate, cyclohexylmethacrylate, norbornyl methacrylate or the corresponding acrylates. Mixtures of compatible (meth)acrylate monomers may also be used. Methacrylic and acrylic comonomers based on esters of methacrylic and acrylic acid with poly(ethylene glycol) and/or polypropylene glycol and/or glycol ethers may also be used.

Functional comonomers may also be used in the poly (meth)acrylate, e.g., acid, hydroxyl or epoxy functionalized (meth)acrylic comonomers although this list is not exclusive. Suitable hydroxyl functionalized comonomers that can be incorporated into the acrylic polymer include, but are not limited to, 2-hydroxyethylmethacrylate, 2-hydroxyl propylmethacrylate and 2-hydroxybutyl methacrylate or the corresponding acrylates. Suitable acid functional comonomers that can be incorporated into the acrylic polymer include, but are not limited to, methacrylic acid and acrylic acid.

Virtually any ethylenically unsaturated monomer may be utilized as a comonomer in the (meth)acrylic polymers. Other additional vinyl comonomers that may be used include are vinyl esters (e.g., vinyl acetate and vinyl propionate); vinyl ethers; esters of crotonic acid, maleic acid, fumaric acid and itaconic acid; styrene; alkyl styrenes; acrylonitrile; butadiene; as well as comonomers thereof.

The poly(meth)acrylate may be formed by free-radical polymerization techniques well-known in the art using azo- or peroxide-initiator in solvent, bulk, suspension or emulsion polymerization. Suspension polymerization is particularly useful as it is a facile way of providing polymer in bead form for subsequent formulation into the thermally reversible hot melt coating composition.

Antioxidants may be optionally added to the thermally reversible hot melt adhesive. Various antioxidants based on different chemistries are supplied, for example, by Ciba under the trade name Irganox, Irgafos or Irgastab. Blends of antioxidants may be preferred for the adhesive, for there is a synergistic effect of such combination. Antioxidants may be used in the concentration range 0.1-10%, preferably 0.5-5%, based on the total weight of the adhesive.

The composition may also include a tackifying resin, which are low molecular weight natural or petroleum based materials. Suitable tackifiers include, without limitation, rosin, rosin derivatives, rosin ester, aliphatic hydrocarbons, aromatic hydrocarbons, aromatically modified aliphatic hydrocarbons, aliphatically modified aromatic hydrocarbons, terpenes, terpene phenolics. Tackifying resins are typically employed in range up to 50 wt %, preferably 5-30 wt %, and most preferably 10-25 wt %, based on the total weight of the adhesive.

If desired, the thermally reversible hot melt adhesive may also be formulated with conventional additives that are compatible with the adhesive. Such additives include plasticizers, curing catalysts, dissociation catalysts, paraffin or microcrystalline waxes, fillers, pigments and adhesion promoters and stabilizers and hydrogenated castor oil, organosilane adhesion promoters. The additives are typically employed in the range of 0.1-10 wt %, preferably 0.5-5.0 wt %.

The thermally reversible hot melt adhesive may be transported and stored in a crosslinked state at ambient temperature.

For application of the thermally reversible hot melt adhesive, the adhesive is heated above the dissociation temperature of the bonds which can be formed between the diene and dienophile. By heating the adhesive to an appropriate temperature, these covalent bonds break and the viscosity of the material becomes low enough to be applied by conventional means, e.g. by slot coating, roller coating or spraying. The application temperature of the adhesive will typically be 20-60° C. above the diene/dienophile bond dissociation temperature, although this is not limiting. The dissociation temperature may be tuned by the backbone structure of the multifunctional diene and multifunctional dienophile, the degree of functionality and the formulation components. Preferably, for some applications this dissociation temperature is above 80° C., more preferably for other applications above 100° C., more preferably for other applications above 120° C. and more preferably for some applications above 140° C.

In another aspect, the multifunctional diene monomer/prepolymer and multifunctional dienophile monomer/prepolymer may be stored separately and combined shortly before application onto substrates. The temperature should be kept high enough to restrict significant bond formation between diene and dienophile, and to prevent crosslinking. For example, the multifunctional diene monomer/prepolymer and multifunctional dienophile monomer/prepolymer may be fed separately to an application unit and dispensed within seconds or minutes after mixing. Or alternatively, the multifunctional diene monomer/prepolymer and multifunctional dienophile monomer/prepolymer may be mixed prior to application and kept in a hot tank for minutes or hours before application. The two components are combined above the dissociation temperature of the covalent bonds which can be formed between the dienes and dienophiles and the adhesive is applied hot either (1) after cooling the adhesive to a crosslinked form and reheating or (2) keeping the adhesive hot so that it does not crosslink during storage and application but crosslinks upon cooling.

Upon cooling the adhesive, the bonds between the multifunctional diene monomer/prepolymer and the multifunctional dienophile monomer/prepolymer reform. The adhesive may be repeatedly heated and cooled without negatively affecting the performance of the adhesive.

One embodiment of the invention is directed to a method for bonding materials together which comprises (1) heating a thermally reversible hot melt composition to a molten form, (2) applying the composition to a first substrate (3) bringing a second substrate in contact with the composition applied to the first substrate, and (4) cooling the applied composition and thereby forming a bonded substrates.

The thermally reversible hot melt adhesives are particularly useful in many applications such as packaging, graphic arts, construction, footwear, textiles, general assembly, automotive and consumer goods. Packaging applications include, for example but not limited to, flexible packaging using bonded plastic films. Graphic arts applications include, for example but not limited to, spine glues for bookbinding of paper/coated paper. Construction applications include, for example but not limited to, rigid panel lamination and profile wrapping of wood and plastics, furniture and windows. Footwear applications involve the bonding of polymers in shoe soles. General assembly includes, for example but not limited to, the assembly of plastic components for industrial use. Automotive applications include, for example but not limited to, headlamp bonding of plastic components and interior trim applications involving a variety of substrates such as textile/fabric. Textile bonding includes, for example but not limited to, the flexible lamination of breathable membranes for outdoor clothing. Consumer applications include, for example but not limited to, adhesives and sealants for use in the home for decoration and repair.

The thermally reversible compositions of the invention can also be used as primer layers. Primers are usually thin layers of polymer which are coated on substrates in order to enhance the adhesion of adhesives with the substrates. The thermally reversible primer compositions can be coated directly in 100% solids form, or they can be diluted with solvents in order to produce very thin layers, e.g. 0.1-10 microns.

Another aspect of the invention is directed to a method for bonding materials together which comprises (1) heating a thermally reversible primer composition, (2) applying the primer composition onto a substrate, (3) cooling the primer composition, (4) applying an adhesive composition on the primer, (5) bringing a second substrate in contact with the adhesive composition, and (6) cooling the adhesive composition if necessary, thereby forming a bonded substrates. The adhesive composition may be any type of adhesive composition including hot melt, liquid, solvent based or water based. Adhesives may be 1-part or 2-part and can be unreactive (uncured) or reactive (cured). Still further the invention provides articles manufactured using the composition of the invention as a primer layer between an adhesive and a substrate. By heating the bonded joint to above the dissociation temperature of the bonds formed between diene and dienophile in the thermally reversible primer, the bonded adhesive can easily be separated from the surface comprising the thermally reversible primer.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Examples

The following multifunctional furans (MFF) and multifunctional maleimides (MFM) were used or prepared as follows. The estimated P and Q values are also listed.

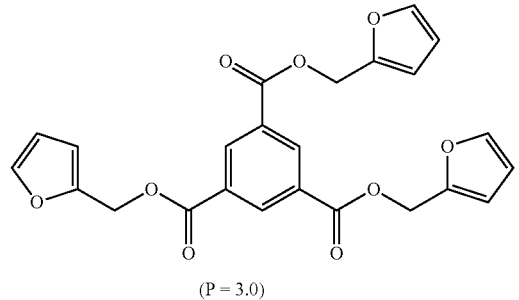

MFF-1

(P = 3.0)

MFF-1 was synthesized as follows. To an ice cooled solution of 1,3,5-benzenetricarbonyl chloride (20 g, 75.3 mmol) in $CH_2Cl_2$ (200 mL) at 0° C. was added triethylamine (26.7 g, 263 mmol). After stirring at this temperature for 15 min, furfuryl alcohol (22.2 g, 226 mmol) was added drop wise using an additional funnel. This exothermic reaction was carefully controlled to prevent $CH_2Cl_2$ from boiling. The reaction mixture was stirred using a mechanical stirrer for about two h. TLC monitoring gave an indication about completion of the reaction. $CH_2Cl_2$ was evaporated and ethyl acetate was added to the mixture. The solution was filtered and washed with ethyl acetate. The filtrate was washed with water and dried over anhydrous $MgSO_4$. Solvent evaporation followed by drying in Kugelrohr gave MFF-1 as a brown colored solid (43 g, 83%).

$^1$H NMR ($CDCl_3$): δ 8.8 (s, 3H), 7.45 (s, 3H), 6.5 (m, 3H), 6.4 (t, 3H), 5.35 (s, 6H)

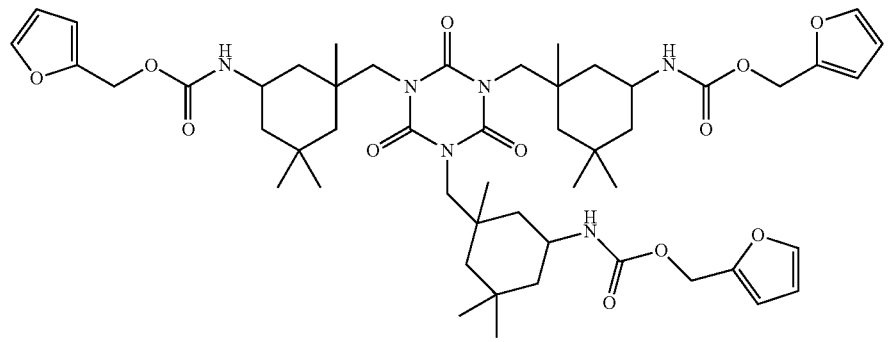

MFF-2

(P = 3.0-3.6)

MFF-2 was synthesized as follows. To a butyl acetate solution of isophorone diisocyanate trimer (Desmodur Z 4470 supplied as a butyl acetate solution, 142.87 g of the solution, active component 100 g, 410 mmol) was added furfuryl alcohol (40.2 g, 410 mmol) and 4 drops of dibutyltin dilaurate. The resulting mixture was stirred with a mechanical stirrer and heated at 85° C. for 4 h until IR indicated disappearance of the isocyanate band. After cooling to RT, 100 mL of toluene was added and the solvent evaporated in a rotovap under vacuum. The residual solvent was evaporated using Kugelrohr distillation set up at 70° C. and the product further dried in a vacuum oven under vacuum overnight at 60° C. This gave MFF-2 as a light brown powder (130 g, 92%).

$^1$H NMR (CDCl$_3$): δ 7.35 (s, 1H), 6.3-6.4 (m, 2H), 5.0 (brs, 2H), 3.7 (m, 2H), 2.0-0.6 (m).

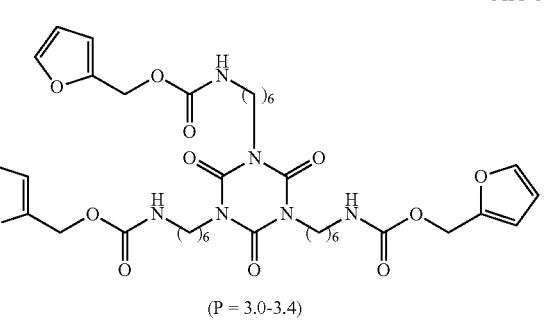

(P = 3.0-3.4)

MFF-3 was synthesized as follows. To a solution of Desmodur N3300 (150 g, 220 mmol) in toluene (300 mL) was added furfuryl alcohol (65 g, 661 mmol) and 4 drops of DBTL. The resulting mixture was heated at 85° C. for about 3 h until the IR showed disappearance of the isocyanate band. Toluene was evaporated and the residual solvent was removed using Kugelrohr distillation set up. This gave MFF-3 (215 g, quantitative).

$^1$H NMR (CDCl$_3$): δ 7.5 (s, 1H), 6.3-6.4 (m, 2H), 3.9-3.6 (m, 2H), 3.3-3.0 (m, 2H), 1.7-1.2 (m, 8H).

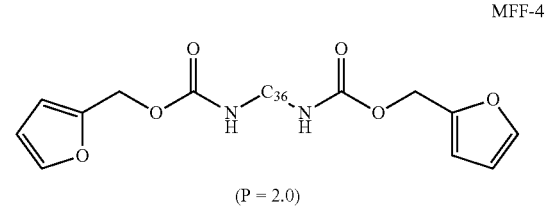

(P = 2.0)

MFF-4 was synthesized as follows. A mixture of dimerdiisocyanate DDI-1410 (50 g, 85 mmol), furfuryl alcohol (16.7 g, 170 mmol) and DBTL in toluene were heated at 85° C. for 3 h. The reaction was monitored by IR disappearance of the isocyanate band. After about 3 h, the reaction was stopped and the solvent evaporated under vacuum. Last traces of the solvent were removed by Kugelrohr distillation set up. This gave MFF-4 in quantitative yield (67.45 g).

$^1$H NMR (CDCl$_3$): δ 7.45 (s, 2H), 6.4-6.6 (m, 4H), 5.1 (s, 4H), 3.1-3.3 (m, 4H), 1.6-0.5 (m)

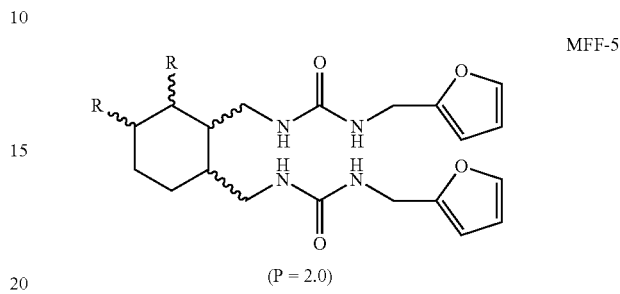

(P = 2.0)

MFF-5 was synthesized as follows. To a toluene (250 mL) solution of DDI 1410 (50 g, 85 mmol) at RT was added furfuryl amine (16.5 g, 169.7 mmol) and stirred for 2 h. The solvent was evaporated using rotovap. The residual solvent was removed by Kugelrohr distillation set up. This gave MFF-5 (60 g, 90%) as a low melting solid.

$^1$H NMR (CDCl$_3$): δ 7.35 (s, 2H), 6.3 (s, 2H), 6.2 (s, 2H), 4.3 (s, 4H), 3.15 (m, 4H) 1.8-0.8 (m)

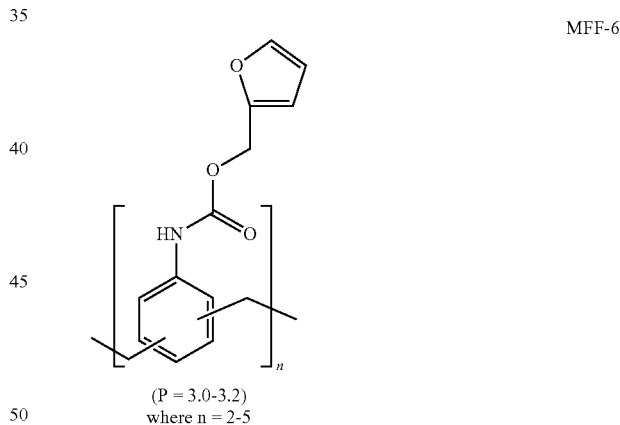

(P = 3.0-3.2)
where n = 2-5

MFF-6 was synthesized as follows. To a toluene solution (500 mL) of poly phenylisocyanate-co-formaldehyde (100 g, 250 mmol) was added furfuryl alcohol (78.5 g, 1.2 mol) and two drops of dibutyltin dilaurate. The resulting solution was heated at 85° C. for about 3 h until the IR showed disappearance of the isocyanate band. Toluene was evaporated using rotovap and the residual solvent was removed by Kugelrohr distillation at 50° C. for 2 h. This gave MFF-6 as a brown solid (160 g).

$^1$H NMR (CDCl$_3$): δ 7.6-6.7 (m), 6.5-6.2 (m), 5.2-5.0 (m), 3.9-3.6 (m).

MFF-7

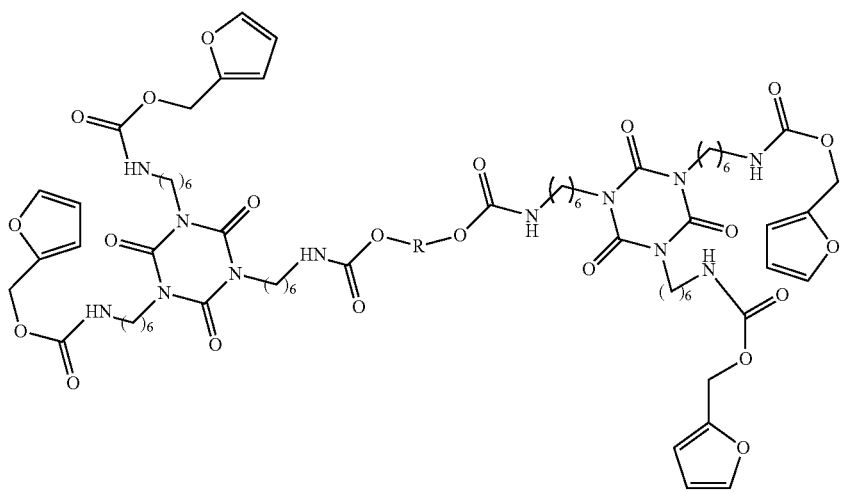

(P = 4.0)
R = Priplast 1838 polyesterpolyol backbone
$M_n$ = 2000

MFF-7 was synthesized as follows. To a solution of Desmodur N3300 (70 g, 103 mmol) in toluene (500 mL) was added furfuryl alcohol (24.2 g, 124 mmol). After heating at 85° C. for 3 h, Priplast 1838 polyesterpolyol was added (103 g, 25.7 mmol) and the resulting mixture heated for a further 3 h at 85° C. until the IR showed complete disappearance of isocyanate band. Toluene was evaporated and the residual solvent was removed by distillation in Kugelrohr distillation set up to give MFF-7 (196 g, quantitative).

MFF-8 (P=4), tetrafunctional furan derived from Desmodur XP 2599, was synthesized as follows. In a 4 necked 2 L flask equipped with a mechanical stirrer, reflux condenser, a nitrogen inlet and an addition funnel was taken Desmodur XP 2599 (1014 g, 363 mmol, 1.57 meq/g of isocyanate as determined by isocyanate titration). The flask was heated in an oil bath with stirring (stir speed 300 rpm) in the presence of nitrogen (oil bath temperature 84-86° C.). Once the pot temperature reaches a constant value (about 80° C.), 10 drops of DBTL was added. Furfuryl alcohol (quantity was determined by isocyanate titration, 148.7 g, 1.52 moles) was added slowly dropwise using a pressure equalizing funnel. The reaction temperature was in the range 80-97° C. depending on the rate of addition. The addition rate was controlled so that the reaction temperature did not go above 100° C. Once the IR indicated consumption of isocyanate functionality (about 1 h of addition time followed by additional 30 min stirring), the contents were transferred to a sample container.

SRM-1 available from Henkel Corporation (Rocky Hill, Conn., USA)

MFM-2

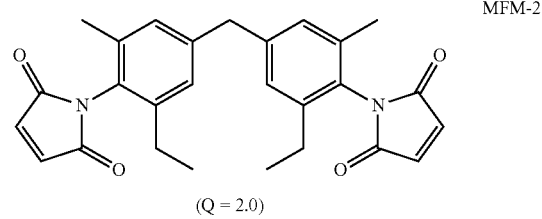

(Q = 2.0)

BMI-5100, available from Daiwakasei Industry (Japan)

MFM-3

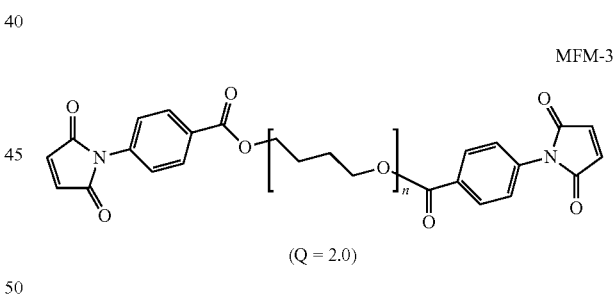

(Q = 2.0)

MFM-3 was synthesized as follows. Maleic anhydride (30 g, 305 mmol) and acetone (125 mL) were added to an oven-dried, $N_2$-flushed 500 mL, 3 necked round bottom flask fitted with a teflon/glass stirrer, addition funnel, Y-adapter contain-

MFM-1

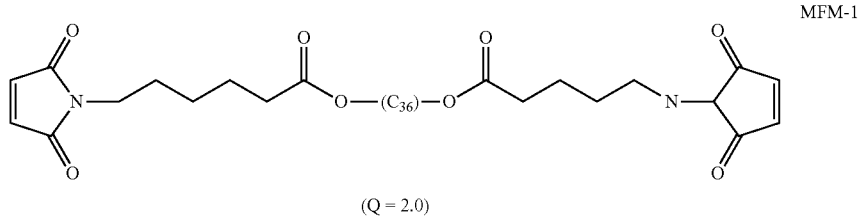

(Q = 2.0)

ing a thermocouple, condenser and gas inlet. Versalink P650 (126 g, 303 mmol) was dissolved in acetone (100 mL) and added drop wise to a maleic anhydride solution over 1 h. The reaction mixture was allowed to warm to room temperature and maintained until FTIR confirmed the absence of anhydride band. Acetic anhydride (78 g, 765 mmol), triethylamine (13.5 g, 133 mmol) and manganese(II) acetate tetrahydrate (1.28 g, 5.2 mmol) were added and the reaction mixture was heated at 40° C. for 2 h and 50° C. for 1 h. After cooling to room temperature overnight, the reaction mixture was concentrated using rotovapor, dissolved in $CH_2Cl_2$, washed with water and dried over anhydrous $MgSO_4$. The solvent was evaporated and the product was dried using Kugelrohr distillation set up to give MFM-3 (142 g, 89%).

$^1$H NMR ($CDCl_3$): δ 8.2 (d, 4H), 7.5 (d, 4H), 6.9 (s, 4H), 4.4 (t, 4H), 3.5 (m), 1.9-1.6 (m)

MFM-6 (Q=2) was synthesized in a similar way to MFM-4 but based on polyester polyol Dynacoll 7490 (Evonik).

MFM-7 (Q=2) was synthesized in a similar way to MFM-4 but based on polyester polyol Dynacoll 7250 (Evonik).

MFM-8 (Q=2) was synthesized in a similar way to MFM-4 but based on polyester polyol Dynacoll 7231 (Evonik).

MFM-9 (Q=2) was synthesized in a similar way to MFM-4 but based on polyester polyol Priplast 3196 (Croda).

Formulation and Lap Shear

Samples were prepared as shown in Table 1. The MFF(s) and MFM(s) were blended together and heated at a fixed temperature in the range 120-160° C. for 15-30 minutes.

To determine the bond strength of the adhesive, lap shear tests were conducted on Beechwood specimens of dimensions 115×25×3 mm. 250 microns of adhesive were applied at a fixed temperature (in the range 120-160° C.) to an area

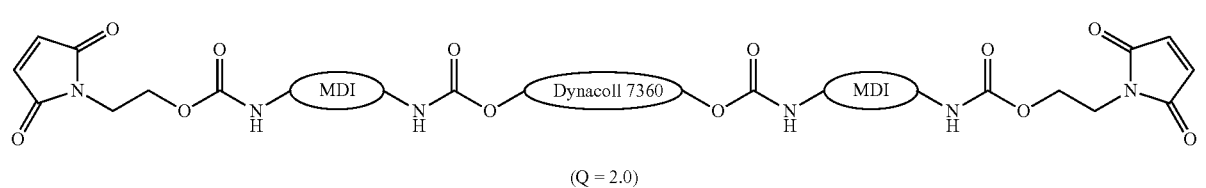

MFM-4

(Q = 2.0)

MFM-4 (Q=2) was synthesized as follows. Dynacoll 7360 (polyester polyol from Evonik with Mn=3500 g per mole) was weighed into a glass flask and stirred at 120° C. and vacuum was applied for one hour. MDI was added and allow to react with the hydroxyl groups at 120° C. for one hour (2/1 NCO/OH), part of the time under vacuum, to make an MDI terminated prepolymer. In a 2 liter 4 necked flask equipped with a mechanical stirrer, was taken MDI endcapped Dynacol 7360 prepolymer (1 Kg, 12.5 wt % of MDI, 2.274% of isocyanate content as determined by titration). The mixture was heated at 110° C. with a mechanical stirrer (stir speed 200 rpm). Once the reaction temperature reached 110° C., 500 ppm of Irganox 1010 was added followed by 8 drops of DBTL. 2-hydroxyethylmaleimide (76 g, 539 mmol as calculated by isocyanate titration) was added in batches. The IR showed near disappearance of the isocyanate band (about 1.5 h). At this point 1 mL of ethanol (21 mmol) was added and stirred for 30 minutes to quench any residual isocyanate. Quantitative yield was obtained.

MFM-5 (Q=2) was synthesized in a similar way to MFM-4 but based on polyester polyol Dynacoll 7380 (Evonik).

25×25 mm at the end of six Beechwood strips using a preheated coating block. As quickly as possible, a second beech wood strip was placed on top of each so that the overlap area of the joint was 25×25 mm. The 6 lap shear joints were placed on top of each other between metal plates. A pressure of 50 psi was applied for 10 seconds to the 6 lap shear joints and the metal plates were tightened. The bonded joints were left for a minimum of 3 days before testing. Joints bonded with Comparative Sample 12 (moisture curing polyurethane hot melt adhesive PF-9021) were prepared in the same way but allowed to cure at 23° C./50% RH for 1 week before testing.

The shear strengths were measured using a JJ Lloyd tensometer, with a crosshead speed of 125 mm/minute. The shear strength at break was recorded by dividing the force by the area of lap shear overlap ($N/mm^2$=MPa). Lap shear strength was measured at room temperature/humidity and at 80° C. in an air-circulated oven for Method 1 and Method 2, respectively. Results are shown in Table 1.

TABLE 1

| Sample # | % MFF # | % MFM # | Lap Shear Method 1 (MPa) | Lap Shear Method 2 (MPa) |
|---|---|---|---|---|
| 1 | 24% MFF-1 | 76% MFM-1 | 5.4 | 0.8 |
| 2 | 49% MFF-2 | 51% MFM-1 | 2.0 | 1.8 |
| 3 | 37% MFF-3 | 63% MFM-1 | 5.8 | 0.7 |
| 4 | 32% MFF-6 | 68% MFM-1 | 3.1 | 1.5 |
| 5 | 27% MFF-1 | 63% MFM-1 | 3.3 | 1.8 |
|   |           | 10% MFM-2 |     |     |
| 6 | 21% MFF-3 | 59% MFM-1 | 4.7 | 0.7 |
|   | 20% MFF-5 |           |     |     |
| 7 | 14% MFF-1 | 51% MFM-1 | 5.6 | 0.7 |
|   | 25% MFF-4 | 10% MFM-2 |     |     |
| 8 | 20% MFF-1 | 57% MFM-1 | 3.2 | 1.5 |
|   | 13% MFF-4 | 10% MFM-2 |     |     |
| 9 | 25% MFF-5 | 20% MFM-1 | 3.2 | 1.8 |
|   | 40% MFF-7 | 15% MFM-2 |     |     |

TABLE 1-continued

| Sample # | % MFF # | % MFM # | Lap Shear Method 1 (MPa) | Lap Shear Method 2 (MPa) |
|---|---|---|---|---|
| 10 | 25% MFF-5<br>39% MFF-7 | 16% MFM-2<br>20% MFM-3 | 3.0 | 2.2 |
| 11[a] | 20.2% MFF-1 | 63.9% MFM-1 | 3.7 | 0.4 |
| Comparative 12 (PF-9021) - moisture cured polyurethane hot melt (Henkel Corporation) | | | 4.7 | 1.2 |
| Comparative 13 (Unirez 2638) - 13 thermoplastic polyamide hot melt (Arizona Chemical Company) | | | 2.5 | 0 |
| Comparative 14 (Powerweld 200) thermoplastic polyolefin hot melt (Henkel Corporation) | | | 3.9 | 0.2 |

[a]Sample 11 additionally contains 15.9% of thermoplastic acrylic polymer, Elvacite 4044 from Lucite International The above results indicate that a wide variety of dienes and dienophiles may be combined to produce an adhesive with better performance than comparative thermoplastic hot melt adhesives C13 and C14, especially with respect to heat resistance. The performance of the thermally reversible hot melt adhesives are often similar to or better than the comparative moisture cured polyurethane hot melt adhesive C12.

Sample 12 (mixture of 22.3% MFF-2, 5.0% MFM-2, 25% MFM-4 and 47.7% MFM-7 under the same condition as Samples 1-11) was evaluated on various substrates obtained from Rocholl GmBH with area 100×25 mm (plastic substrate thickness 2 mm, metal substrate thickness 1.5 mm). After removing the protective film, each plastic was cleaned with isopropanol before use. The metal substrates were abraded then rinsed with acetone before use. 250 microns of adhesive were applied at a fixed temperature to an area 25×25 mm at the end of six substrate pieces of area using a preheated coating block. As quickly as possible, a second substrate strip was placed on top of each so that the overlap area of the joint was 25×25 mm. Clips were applied to each lap shear joint. The bonded joints were left for a minimum of 3 days before removing the clips and testing. Joints bonded with Comparative Sample 12 (moisture curing polyurethane hot melt adhesive PF-9021) were prepared in the same way but allowed to cure at 23° C./50% RH for 1 week before testing. The shear strengths were measured at room temperature using a JJ Lloyd tensometer, with a crosshead speed of 125 mm/minute. The shear strength at break was recorded by dividing the force by the area of lap shear overlap (N/mm$^2$=MPa). Sample 12 (applied at 150° C., melt viscosity 10,000 mPa·s) was compared to comparative sample 12 (PF-9021 applied at 120° C., melt viscosity 12,000 mPa·s in Table 2. Substrate failure is noted as (S) and adhesive failure is noted as (A).

TABLE 2

| substrate | Sample 12 Lap shear strength (MPa) | Comparative 12 Lap shear strength (MPa) |
|---|---|---|
| Poly(methyl methacrylate) | 1.5 (S) | 1.75 (A) |
| Polycarbonate | 4.9 (S) | 4.2 (A) |
| Poly(vinyl chloride) | 2.3 (S) | 3.6 (S) |
| ABS | 3.7 (S) | 3.8 (A) |
| Galvanised steel | 1.9 (A) | 2.9 (A) |
| Aluminium | 7.9 (A) | 2.9 (A) |

Melt Viscosity and Stability

Antioxidants, as specified in Table 3 were added to Sample 1 to at 120° C. and both melt viscosity and thermal stability were evaluated. The viscosity was measured as a function of time after holding at high temperature and compared to PF-375B, a moisture curing polyurethane hot melt supplied by Henkel Corporation.

Melt viscosity was measured using a Brookfield Viscometer model RVDV-1+ with a Model 74R temperature controller and Thermosel unit, using spindle no. 27. The adhesive was heated in an oven to 135° C. 14 g of adhesive was weighed into a disposable aluminum viscometer tube. The tube was inserted into the Viscometer and left to equilibrate to a constant viscosity reading at a fixed temperature of 135° C. for 20 minutes. The viscosity was further measured after keeping the adhesive at fixed temperature for several hours. Results are shown in Table 3.

TABLE 3

| Time (hours) | Comparative Sample PF-375B (at 135° C.) (cP) | Sample 1 + 5% Irganox 565 (at 135° C.) (cP) | Sample 1 + 2% Irgastab UV-10 (at 135° C.) (cP) |
|---|---|---|---|
| 0 | 1500 | 380 | 200 |
| 1 | 1900 | 465 | 245 |
| 2 | 2415 | 605 | 340 |
| 3 | 3040 | 800 | 760 |
| 4 | 3835 | 1100 | 1440 |
| 5 | 4875 | 1733 | 2050 |

The tests demonstrate that the increase of viscosity with time for compositions of the thermally reversible adhesive is similar to a moisture curable polyurethane hot melt adhesive.

Reversibility and Melt Viscosity

To demonstrate reversibility, Sample 1+2% Irgastab UV-10 was remade and subjected to various conditions and the corresponding melt viscosities were measured. The conditions and melt viscosities are summarized in Table 4.

TABLE 4

| | condition | Melt viscosity at 135° C. (cP) |
|---|---|---|
| 1.<br>2. | mixed for 30 minutes at 135° C.<br>measure melt viscosity | 400 |
| 1.<br>2.<br>3.<br>4. | mix for 30 minutes at 135° C.<br>cool to room temperature for 4 hours,<br>reheat to 135° C.<br>measure melt viscosity at 135° C. | 470 |
| 1.<br>2.<br>3.<br>4. | mix for 30 minutes at 135° C.<br>cool to room temperature for 24 hours<br>reheat to 135° C.<br>measure melt viscosity at 135° C. | 585 |
| 1.<br>2.<br>3.<br>4. | mix for 30 minutes at 135° C.<br>cool to room temperature for 3 days<br>reheat to 135° C.<br>measure melt viscosity at 135° C. | 660 |
| 1.<br>2.<br>3.<br>4. | mix for 30 minutes at 135° C.<br>cool to room temperature for 45 days<br>reheat to 135° C.<br>measure melt viscosity at 135° C. | 410 |

Table 4 shows that the thermally reversible hot melt adhesive can be heated, cooled to room temperature for different periods of time and then reheated repeatedly to produce a low melt viscosity.

The invention claimed is:

1. A thermally reversible hot melt adhesive comprising:
  a) at least one multifunctional diene monomer/prepolymer $L\text{-}(X)_P$, wherein
    i) L is independently selected from the group consisting of a (poly)urethane, (poly)urea, (poly)ester having a plurality of repeating ester groups within the backbone, (poly)carbonate, (poly)amide, (poly)imide, (poly)styrene, (poly)ether having a plurality of repeating O atoms within the backbone, (poly)(meth)acrylate, (poly)olefin, (poly)siloxane, copolymers of above, including copolymers of maleic anhydride, and mixtures thereof;
    ii) X is a diene containing one or more of acyclic 1,3-diene, cyclopentadiene, cyclohexadiene, furan, fulvene, pyrrole, naphthalene and anthracene; and
    iii) P is greater than zero;
  b) at least one multifunctional dienophile prepolymer $L\text{-}(Y)_Q$ having a molecular weight greater than 1,000 g/mol, wherein
    i) L is independently selected from the group consisting of a (poly)urethane, (poly)urea, (poly)ester, (poly)carbonate, (poly)amide, (poly)styrene, aliphatic (poly)ether, (poly)(meth)acrylate, (poly)olefin, (poly)siloxane, copolymers of above, including copolymers of maleic anhydride, or mixtures thereof; and
    ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
    iii) Q is greater than zero; and
  wherein at least one of P or Q has a value greater than 2.0.

2. The thermally reversible hot melt adhesive of claim 1, wherein at least one of P or Q has a value less than 3.0.

3. The thermally reversible hot melt adhesive of claim 2, wherein the sum of the P and the Q has a value equal to or greater than 5.0.

4. A thermally reversible hot melt adhesive comprising:
  a) at least one multifunctional diene monomer/prepolymer $L\text{-}(X)_P$, wherein
    i) L is independently selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, and mixtures thereof;
    ii) X is a diene containing one or more of acyclic 1,3-diene, cyclopentadiene, cyclohexadiene, furan, fulvene, pyrrole, naphthalene and anthracene; and
    iii) P is greater than zero;
  b) at least one multifunctional dienophile prepolymer $L\text{-}(Y)_Q$ having a molecular weight greater than 1,000 g/mol, wherein
    i) L is independently selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, or mixtures thereof; and
    ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
    iii) Q is greater than zero;
  wherein at least one of P or Q has a value greater than 2.0 and at least one multifunctional diene monomer/prepolymer is

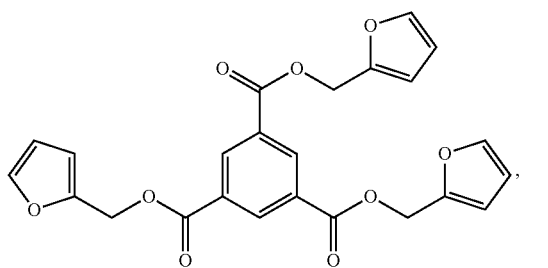

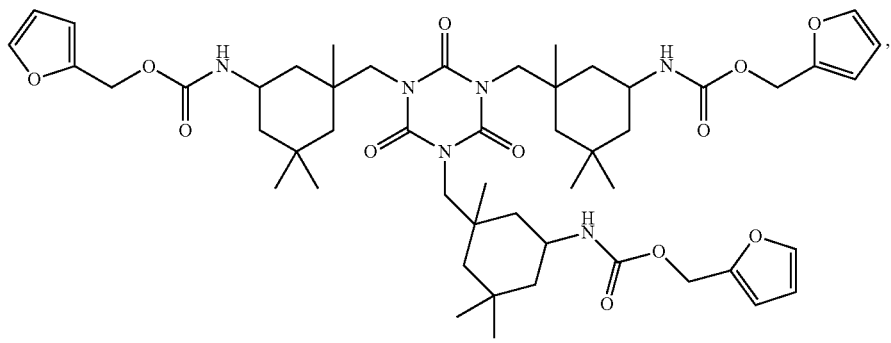

-continued
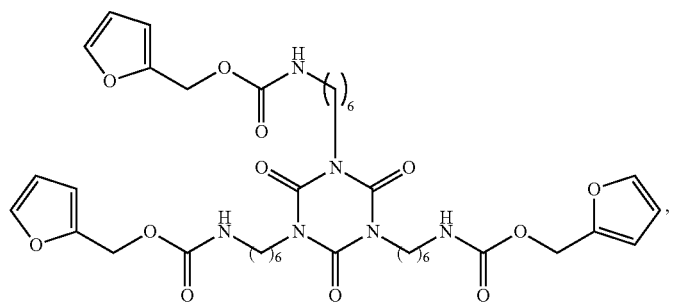
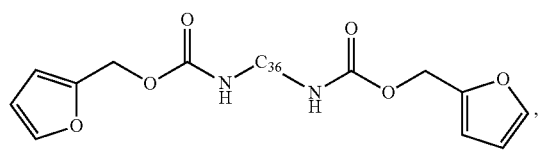
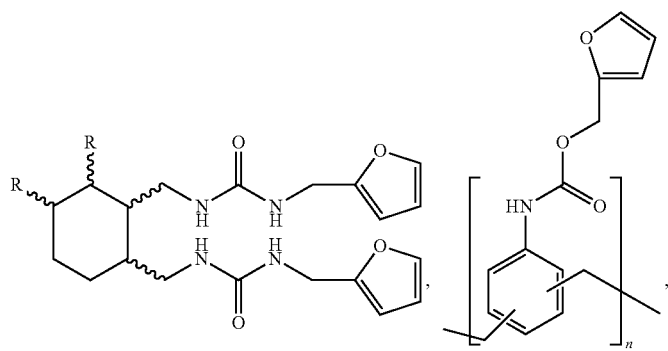
where n = 2-5
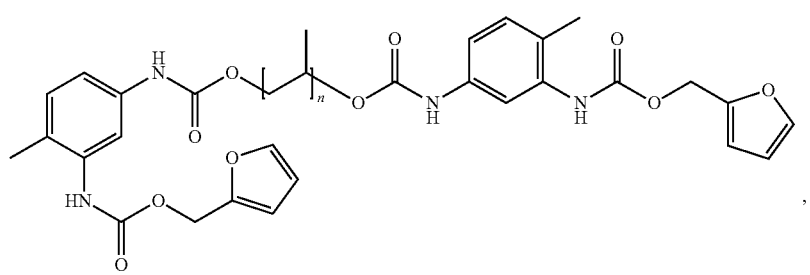
where n = 10-60
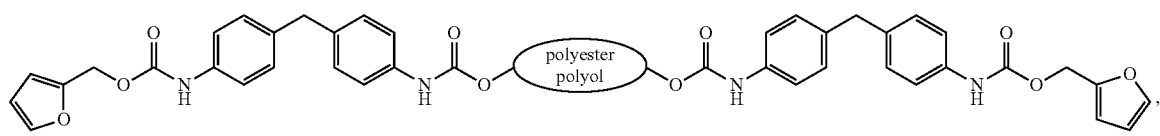

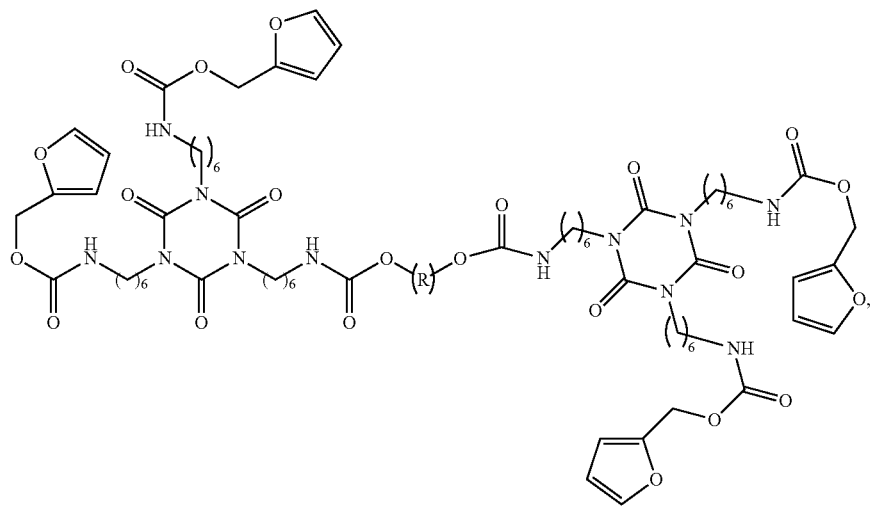

R = Polyesterpolyol or polyetherpolyol backbone or a mixture or a combination thereof.

5. A thermally reversible hot melt adhesive comprising:
 a) at least one multifunctional diene monomer/prepolymer L-(X)$_P$, wherein
   i) L is independently selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, and mixtures thereof;
   ii) X is a diene containing one or more of acyclic 1,3-diene, cyclopentadiene, cyclohexadiene, furan, fulvene, pyrrole, naphthalene and anthracene; and
   iii) P is greater than zero;
 b) at least one multifunctional dienophile prepolymer L-(Y)$_Q$ having a molecular weight greater than 1,000 g/mol, wherein
   i) L is independently selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, or mixtures thereof; and
   ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
   iii) Q is greater than zero;
wherein at least one of P or Q has a value greater than 2.0 and at least one multifunctional dienophile monomer/prepolymer is

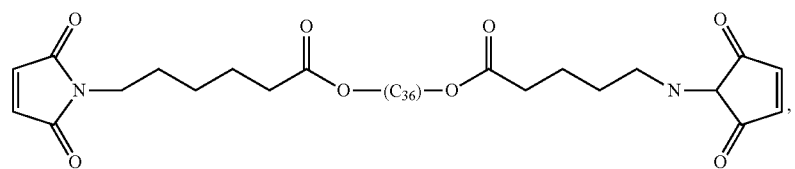

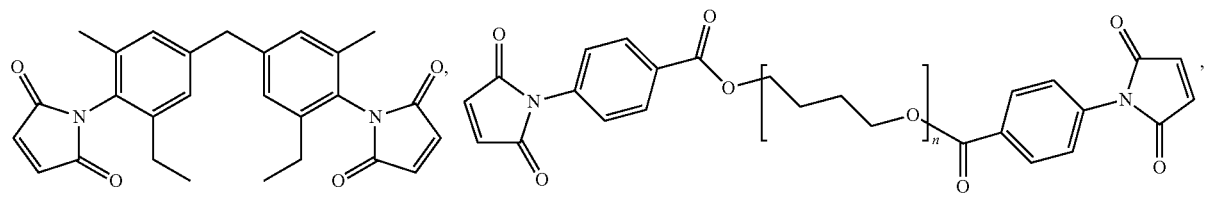

where n = 5-10

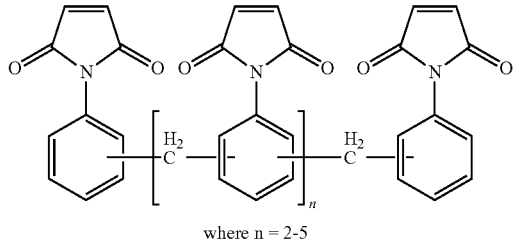

where n = 2-5

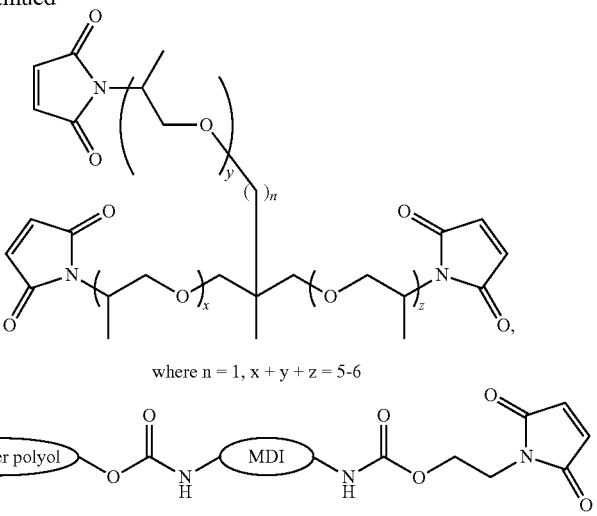

where n = 1, x + y + z = 5-6

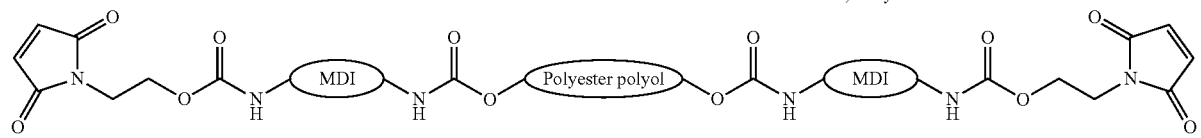

wherein the molecular weight of the polyester polyol segment is from about 2000 to about 7000,

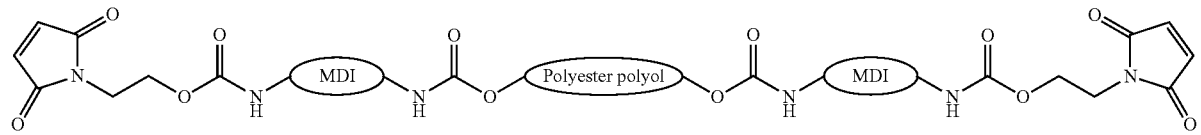

wherein the molecular weight of the polyether polyol segment is from about 1000 to 18,000, or a combination thereof.

6. The adhesive of claim 1, further comprising a thermoplastic polymer.

7. The adhesive of claim 6, wherein the thermoplastic polymer contains acid or hydroxyl groups.

8. A thermally reversible hot melt adhesive comprising:
a) at least one multifunctional diene monomer/prepolymer L-(X)$_P$, wherein
   i) L is independently selected from the group consisting of a (poly)urethane, (poly)urea, (poly)ester, (poly)carbonate, (poly)amide, (poly)imide, (poly)styrene, aliphatic (poly)ether, (poly)(meth)acrylate, (poly)olefin, (poly)siloxane, copolymers of above, including copolymers of maleic anhydride, and mixtures thereof;
   ii) X is a diene containing one or more of acyclic 1,3-diene, cyclopentadiene, cyclohexadiene, furan, fulvene, pyrrole, naphthalene and anthracene; and
   iii) P is greater than zero;
b) at least one multifunctional dienophile prepolymer L-(Y)$_Q$, wherein
   i) L is independently selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, or mixtures thereof; and
   ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
   iii) Q is greater than zero; and
wherein at least one of P or Q has a value greater than 2.0; and
c) a poly(meth)acrylate polymer.

9. A method for bonding substrates together comprising: heating the thermally reversible hot melt adhesive composition of claim 1 above the diene/dienophile bond dissociation temperature to form an uncrosslinked adduct, applying the uncrosslinked adduct onto a first substrate, bringing a second substrate in contact with the adduct applied to the first substrate, and cooling the applied adduct, whereby the adduct cures to bond said first substrate to said second substrate.

10. The method of claim 9 wherein at least one substrate is paper, plastic, wood, textile, foam, glass, metal, composite or ceramic.

11. An article of manufactured comprising the adhesive of claim 1.

12. An article, comprising:
a substrate;
a layer of thermally reversible primer bonded to the substrate; and
a layer of adhesive different from the primer bonded to the primer, wherein the primer comprises:
   a) at least one multifunctional diene monomer/prepolymer L-(X)$_P$, wherein
      i) L is selected from the group consisting of (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, and mixtures thereof; and
      ii) X is a diene containing one or more of acyclic 1,3-diene, cyclopentadiene, cyclohexadiene, furan, fulvene, pyrrole, naphthalene and anthracene; and iii) P is greater than zero;
b) at least one multifunctional dienophile monomer/prepolymer L-(Y)$_Q$ having a molecular weight greater than 1,000 g/mol, wherein
  i) L is selected from the group consisting of a (poly)urethane, (poly)urea, (poly)ester, (poly)carbonate, (poly)amide, (poly)imide, (poly)styrene, (poly)ether, (poly)(meth)acrylate, (poly)olefin, (poly)siloxane, copolymers of above, including copolymers of maleic anhydride, and mixtures thereof; and
  ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
  iii) Q is greater than zero; and
c) optionally, a solvent wherein the average P value for a) is greater than 2.1, or the average Q value for b) is greater than 2.1, or the average P value for a) is greater than 2.1 and the average Q value for b) is greater than 2.1.

13. The article of claim 12, wherein said article is a book, packaging film, rigid panel, furniture, window, footwear, car headlamp, bonded textile/fabric for car trim or clothing.

14. The hot melt adhesive of claim 1 wherein (poly)ester L comprises one or more OH groups or (poly)ether L comprises one or more OH groups.

15. The hot melt adhesive of claim 1 wherein the average P value for a) is greater than 2.1, or the average Q value for b) is greater than 2.1, or the average P value for a) is greater than 2.1 and the average Q value for b) is greater than 2.1.

16. The hot melt adhesive of claim 1 wherein L of the multifunctional diene monomer/prepolymer L-(X)$_P$ is polyester from the reaction of one or more polyhydric alcohols with one or more polycarboxylic acids.

17. A compound selected from:

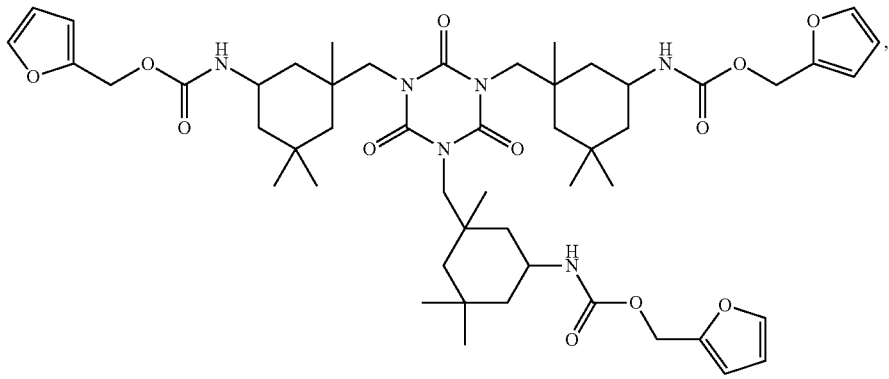

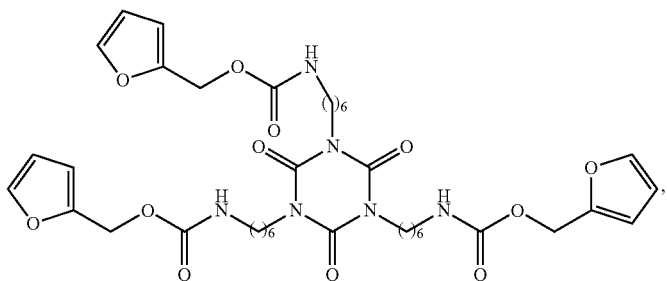

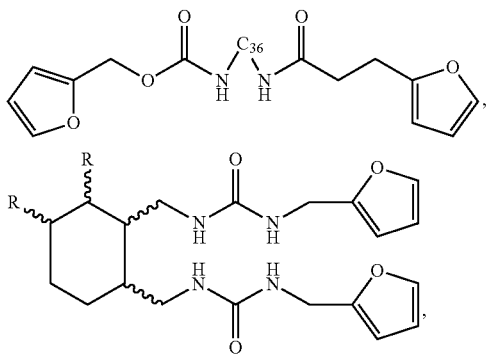

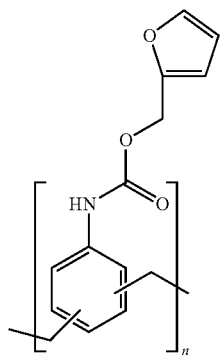
where n = 2-5,
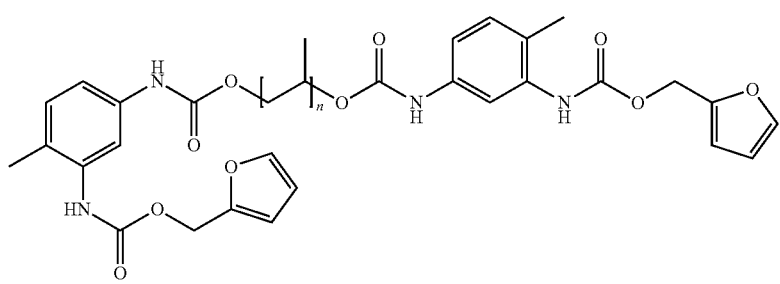
where n = 10-60,
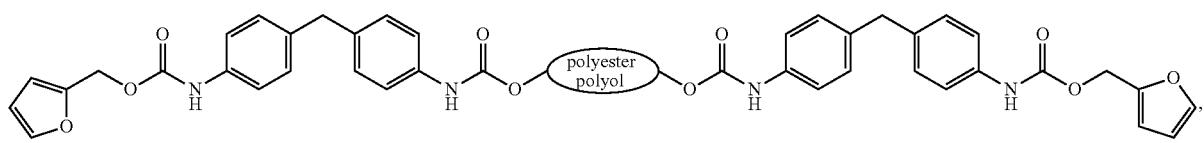
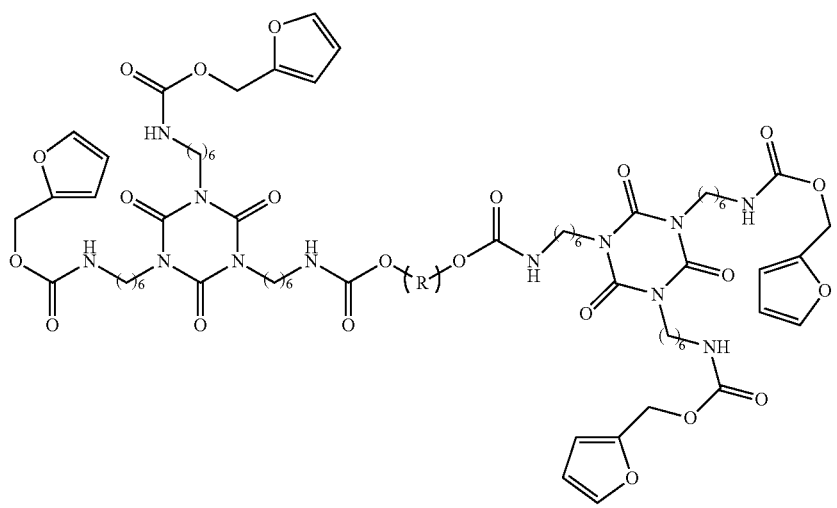
R = Polyesterpolyol or polyetherpolyol backbone or a mixture
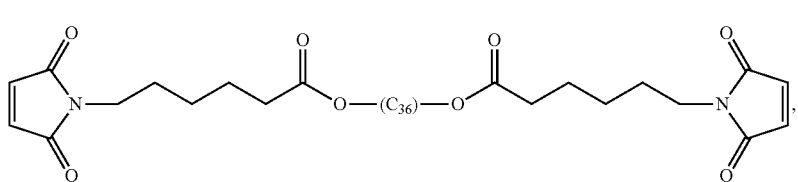

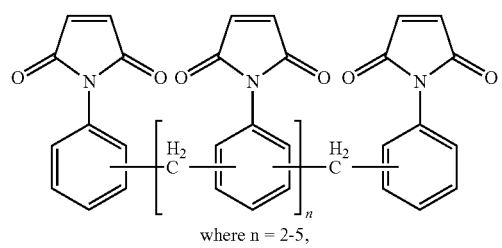

where n = 2-5,

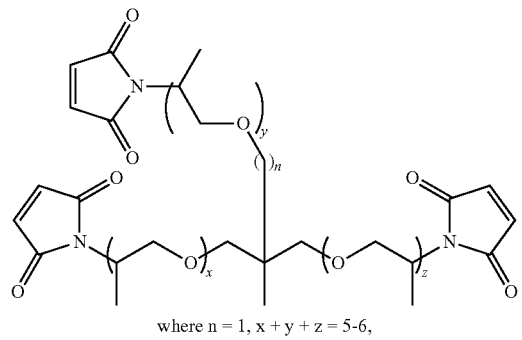

where n = 1, x + y + z = 5-6,

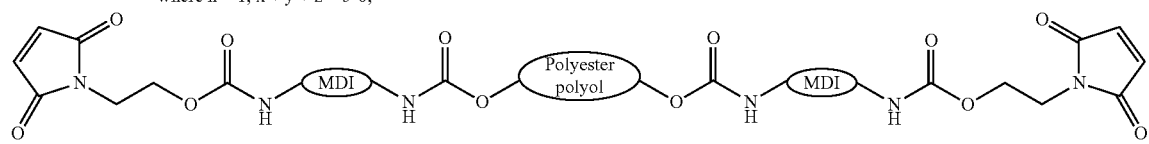

wherein the molecular weight of the polyester polyol segment is from about 2000 to about 7000, and

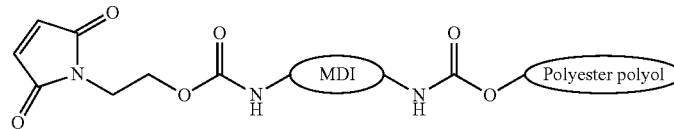 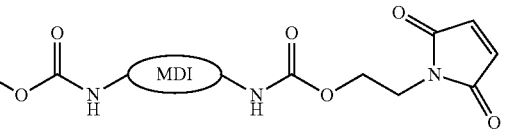

wherein the molecular weight of the polyether polyol segment is from about 1000 to 18,000.

18. The thermally reversible hot melt adhesive of claim 1 wherein for the at least one multifunctional diene monomer/prepolymer L-(X)$_P$, L is independently selected from the group consisting of a (poly)urethane, (poly)urea, (poly)carbonate, (poly)amide, (poly)imide, (poly)styrene, (poly)(meth)acrylate, (poly)olefin, (poly)siloxane, copolymers of above, including copolymers of maleic anhydride, and mixtures thereof.

19. The thermally reversible hot melt adhesive of claim 1 wherein for the at least one multifunctional diene monomer/prepolymer L-(X)$_P$, L is independently selected from the group consisting of a (poly)urethane, (poly)urea, (poly)ester having a plurality of repeating ester groups within the backbone, (poly)carbonate, (poly)amide, (poly)imide, (poly)styrene, (poly)ether having three or more O atoms within the backbone, (poly)(meth)acrylate, (poly)olefin, (poly)siloxane, copolymers of above, including copolymers of maleic anhydride, and mixtures thereof.

20. The article of claim 12 wherein the primer comprises
a) at least one multifunctional diene monomer/prepolymer L-(X)$_P$, wherein
  i) L is independently selected from the group consisting of a (poly)urethane, (poly)urea, (poly)ester having a plurality of repeating ester groups within the backbone, (poly)carbonate, (poly)amide, (poly)imide, (poly)styrene, (poly)ether having a plurality of repeating O atoms within the backbone, (poly)(meth)acrylate, (poly)olefin, (poly)siloxane, copolymers of above, including copolymers of maleic anhydride, and mixtures thereof;
  ii) X is a diene containing one or more of acyclic 1,3-diene, cyclopentadiene, cyclohexadiene, furan, fulvene, pyrrole, naphthalene and anthracene; and
  iii) P is greater than zero;
b) at least one multifunctional dienophile prepolymer L-(Y)$_Q$ having a molecular weight greater than 1,000 g/mol, wherein
  i) L is independently selected from the group consisting of a (poly)urethane, (poly)urea, (poly)ester, (poly)carbonate, (poly)amide, (poly)styrene, aliphatic (poly)ether, (poly)(meth)acrylate, (poly)olefin, (poly)siloxane, copolymers of above, including copolymers of maleic anhydride, or mixtures thereof; and
  ii) Y is a dienophile containing one or more of a maleimide, isomaleimide, citraconimide, itaconimide, maleate, fumarate, acrylate, methacrylate, cyanoacrylate, benzoquinone, benzoquinone oxime, benzoquinone imine, naphthaquinone, alkylidene malonate, alkyne containing electron withdrawing groups and mixtures thereof; and
  iii) Q is greater than zero; and
wherein at least one of P or Q has a value greater than 2.0.

* * * * *

UNITED STATES PATENT AND TRADEMARK OFFICE
CERTIFICATE OF CORRECTION

PATENT NO. : 8,734,939 B2
APPLICATION NO. : 13/323090
DATED : May 27, 2014
INVENTOR(S) : Donald Herr, Laxmisha M. Sridhar and Andrew Slark It is certified that error appears in the above-identified patent and that said Letters Patent is hereby corrected as shown below:

In the specification

Column 13, line 37: Change "mono-" to -- mono --.
Column 13, line 47: Change "so called" to -- so-called --.
Column 14, line 10: Change "7000," to -- 7000. --.
Column 14, line 22: After "also", insert -- be --.
Column 16, line 64: After "substrate", insert -- , --.
Column 20, line 31: After "(m, 4H)", insert -- , --.
Column 25, Table 1 (Comparative 13): Before "thermoplastic", delete "13".
Column 25, Table 1 (Comparative 14): After "(Powerweld 200)", insert -- - --.
Column 25, line 47: After "mPa•s", insert -- ) --.

In the claims

Columns 33-34, bottom Figure: Change "Polyester polyol" to -- Polyether polyol --.
Column 34, line 45: After "claim 9", insert -- , --.
Column 36, line 8: After "claim 1", insert -- , --.
Column 36, line 11: After "claim 1", insert -- , --.
Column 36, line 15: After "claim 1", insert -- , --.
Columns 36-37, Figure 3: Change

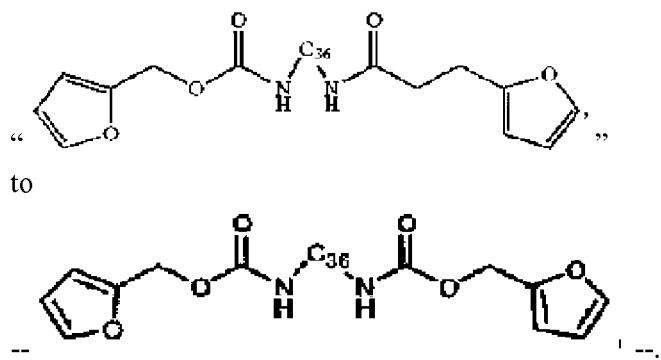

to

--.

Signed and Sealed this
Fifth Day of April, 2016

Michelle K. Lee
*Director of the United States Patent and Trademark Office*

CERTIFICATE OF CORRECTION (continued)
U.S. Pat. No. 8,734,939 B2

In the claims

Column 39, line 42: After "claim 1", insert -- , --.
Column 39, line 50: After "claim 1", insert -- , --.
Column 39, line 60: After "claim 12", insert -- , --.
Columns 39-40, bottom Figure: Change "Polyester polyol" to -- Polyether polyol --.